United States Patent
Uchida

(10) Patent No.: US 7,975,091 B2
(45) Date of Patent: Jul. 5, 2011

(54) INFORMATION PROCESSOR CAPABLE OF SUPPLYING POWER TO AN ELECTRONIC DEVICE CONNECTED THERETO

(75) Inventor: Katsuhiro Uchida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 12/555,725

(22) Filed: Sep. 8, 2009

(65) Prior Publication Data

US 2010/0161869 A1    Jun. 24, 2010

(30) Foreign Application Priority Data

Dec. 19, 2008    (JP) ................... 2008-324487

(51) Int. Cl.
G06F 13/20 (2006.01)
G06F 1/00 (2006.01)
H02J 7/00 (2006.01)
H02J 1/10 (2006.01)

(52) U.S. Cl. ........ 710/313; 710/305; 713/300; 713/320; 713/323; 320/103; 320/124; 307/43

(58) Field of Classification Search ............ 710/313; 713/300, 323; 320/103, 124; 307/43
See application file for complete search history.

(56) References Cited

U.S. PATENT DOCUMENTS

| 6,946,817 | B2* | 9/2005 | Fischer et al. ............... 320/132 |
| 7,451,328 | B2* | 11/2008 | Hsieh ........................... 713/300 |
| 7,489,974 | B2* | 2/2009 | Numano ........................ 700/22 |
| 2007/0220290 | A1* | 9/2007 | Tsai et al. .................... 713/300 |
| 2009/0200982 | A1* | 8/2009 | Hurtz .......................... 320/103 |
| 2010/0070659 | A1* | 3/2010 | Ma et al. ...................... 710/14 |
| 2010/0275001 | A1* | 10/2010 | Yoshioka et al. ............... 713/2 |

FOREIGN PATENT DOCUMENTS

| JP | 10-301899 A | 11/1998 |
| JP | 2001-117676 A | 4/2001 |
| JP | 2001-242965 A | 9/2001 |
| JP | 2004-094495 A | 3/2004 |
| JP | 2004-152317 A | 5/2004 |
| JP | 2006-053748 A | 2/2006 |

(Continued)

OTHER PUBLICATIONS

Ienovo—"Lenovo USB Port Replicator with Video User's Guide", Dated Feb. 2006—60 pages.*

(Continued)

Primary Examiner — Brian T Misiura
(74) Attorney, Agent, or Firm — Knobbe, Martens, Olson & Bear, LLP

(57) ABSTRACT

According to one embodiment, an information processor has: an input/output module configured to input/output a data signal through a data signal line; a first voltage supply module configured to supply a first differential signal pair; a second voltage supply module configured to supply a second differential signal pair; a first switching module configured to select and output, in response to a first control signal, one of the first differential signal pair supplied from the first voltage supply module and the second differential signal pair supplied from the second voltage supply module; and a second switching module configured to receive one of the first differential signal pair and the second differential signal pair output from the first switching module, and output one of the first differential signal pair and the second differential signal pair to the electronic device through the data signal line, in response to a second control signal.

19 Claims, 4 Drawing Sheets

FOREIGN PATENT DOCUMENTS

| JP | 2006-065616 A | 3/2006 |
|----|---------------|--------|
| JP | U 3127705 | 11/2006 |
| JP | 2007-310647 | 11/2007 |
| JP | 2007-310647 A | 11/2007 |
| JP | 2008-211327 A | 9/2008 |

OTHER PUBLICATIONS

Toshiba—"Toshiba Satellite Pro Laptop Enhances Intel Centrino 2 Processor with Business Essentials", Dated Jul. 15, 2008—3 pages.*

Pericom—"PI5USB56—USB Sleep and Charge Switch for Single USB Port with Automatic Switching", Dated Jul. 27, 2009—1 page.*

AVERATEC—"3200 Series User's Manual", Dated 2004, 59 pages.*

Notice of Rejection mailed by JPO on Dec. 8, 2009 in the corresponding Japanese patent application No. 2008-324487.

Notice of Rejection mailed by JPO on Mar. 9, 2010 in the corresponding Japanese patent application No. 2008-324487.

Decision to Grant a Patent mailed by JPO on May 18, 2010 in the corresponding Japanese patent application No. 2008-324487.

Explanation of Non-English Language References.

* cited by examiner

INFORMATION PROCESSOR CAPABLE OF SUPPLYING POWER TO AN ELECTRONIC DEVICE CONNECTED THERETO

CROSS-REFERENCE TO RELATED APPLICATIONS

This application is based upon and claims the benefit of priority from Japanese Patent Application No. 2008-324487, filed Dec. 19, 2008, the entire contents of which are incorporated herein by reference.

BACKGROUND

1. Field

One embodiment of the invention relates to an information processor that supplies power to an electronic device connected thereto.

2. Description of the Related Art

Recently, a universal serial bus (USB) (Registered Trademark) specification is widespread, and it has become possible to connect various electronic devices to an information processor such as a personal computer (PC) through the USB. Such electronics devices (hereinafter, referred to as USB devices) are, for example, a keyboard, a mouse, a portable music player having a built-in battery configured to be charged while connected to the PC, and the like.

Besides the widespread of the electronic device having the built-in battery, there is recently known a PC that can charge the electronic device not only during the time when the power of the PC is on (referred to as a normal operation mode) but also during the time when the power thereof is off (referred to as a standby mode). Japanese Registered Utility Model No. 3127705 discloses such PC that switches between a circuit module and a power supply module depending on whether the PC is in the normal operation mode or in the standby mode, so that even in the standby mode the electronic device connected to the PC can be supplied power directly from the power supply module.

Recently, there is known a USB device that is charged only when a differential signal pair transmitted through a pair of data signal lines D+ and D− of the USB has a predetermined voltage difference. Therefore, when the USB device is to be charged, the PC outputs the differential signal pair having the predetermined voltage difference to the USB device.

However, different types of USB devices normally employ different charging specifications, each of which corresponds to different voltage differences (hereinafter, referred to as voltage levels). Hence, the conventional PC cannot charge all of the plurality of USB devices employing different battery charging specifications.

The invention is provided in view of the forgoing, and it is an object of the invention to provide an information processor capable of appropriately charging each of a plurality of electronic devices employing different charging specifications.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
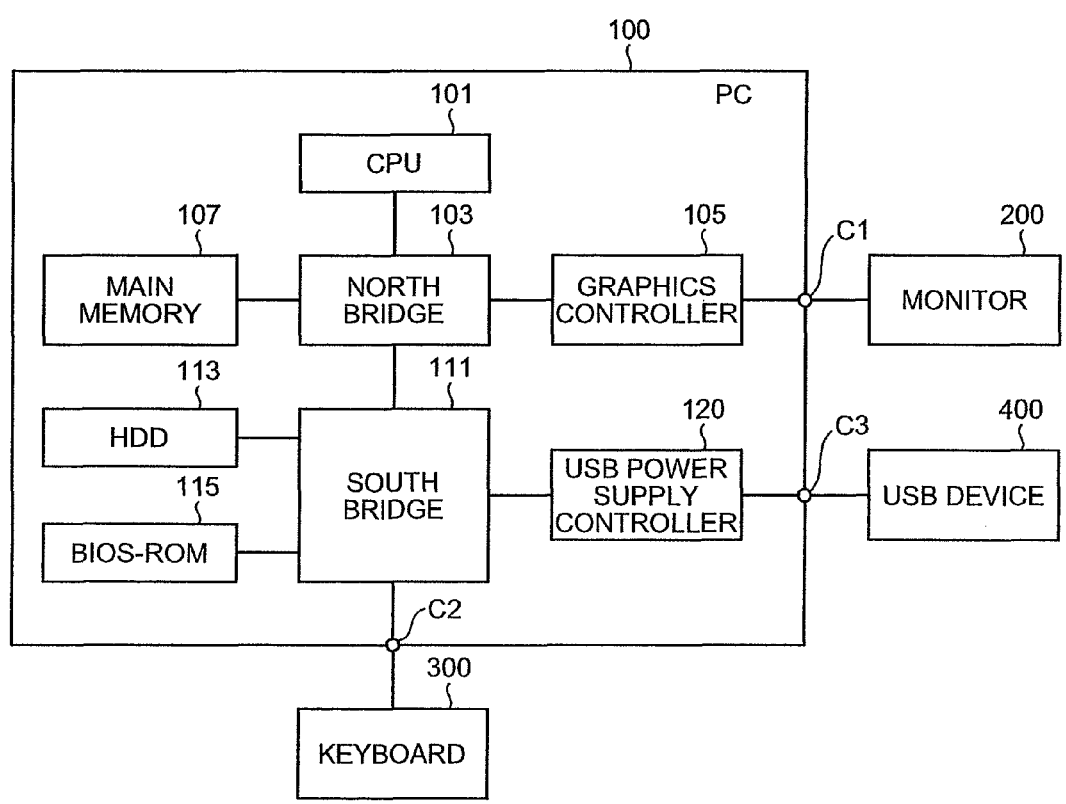
FIG. 1 is an exemplary schematic block diagram of a PC with peripheral devices according to a first embodiment of the invention.

Various embodiments of an information processor according to the invention will be described hereinafter with reference to the accompanying drawings. In general, according to one embodiment of the invention, an information processor that charges one of a plurality of electronic devices replaceably connected thereto via a bus including a data signal line and a power supply line when a differential signal pair output to the one of the electronic devices through the data signal line has a predetermined voltage difference, the one of the electronic devices being charged through the power supply line, the information processor has: an input/output module configured to input/output a data signal through the data signal line; a first voltage supply module configured to supply a first differential signal pair having a first voltage difference; a second voltage supply module configured to supply a second differential signal pair having a second voltage difference; a first switching module configured to select and output, in response to a first control signal, one of the first differential signal pair supplied from the first voltage supply module and the second differential signal pair supplied from the second voltage supply module; and a second switching module configured to input and/or output the data signal with respect to the one of the electronic devices through the data signal line in a normal operation mode, and to output either the first pair of differential signals or the second pair of differential signals selected by the first switch with respect to the one of the electronic devices through the data signal line in a standby mode, in response to a second control signal.

According to another embodiment of the invention, an information processor that charges one of a plurality of electronic devices replaceably connected to the information apparatus via a bus including a data signal line and a power supply line, when a differential signal pair output to the one of the electronic devices through the data signal line is a predetermined voltage difference, the one of the electronic devices being charged through the power supply line, the information processor has: an input and output module configured to input and output a data signal through the data signal line; a first voltage supply configured to supply a first pair of differential signals comprising a first voltage difference; a second voltage supply configured to supply a second pair of differential signals comprising a second voltage difference; and a power supply controller configured to output either the first pair of differential signals or the second pair of differential signals with respect to the one of the electronic devices through the data signal line when a power of the information processor is turned off in response to a control signal. According to still another embodiment of the invention, an information processor that charges one of a plurality of electronic devices replaceably connected to the information apparatus via a bus including a data signal line and a power supply line, when signals of a differential signal pair output to the one of the electronic devices through the data signal line have predetermined voltages, respectively, the one of the electronic devices being charged through the power supply line, the information processor has: an input and output module configured to input and output a data signal through the data signal line; a first voltage supply configured to supply a first pair of differential signals, signals of the first pair of differential signals having predetermined voltages, respectively; a second voltage supply configured to supply a second pair of differential signals, signals of the second pair of differential signals being in a state of short circuit through a resistor; and a power supply controller configured to select either the first pair of differential signals supplied from the first voltage supply or a second pair of differential signals supplied from the second voltage supply as an output in response to a control signal, and to output either the first pair of differential signals or the second pair of differential signals with respect to the one of the electronic devices through the data signal line when a power of the information processor is turned off. According to still another embodiment of the invention, an information processor that charges one of a plurality of electronic devices replaceably connected to the information apparatus via a bus including a data signal line and a power supply line, when a differential signal pair output to the one of the electronic devices through the data signal line is a predetermined voltage difference, the one of the electronic devices being charged through the power supply line, the information processor has: a controller configured to input and output a data signal with respect to the one of the electronic devices through the data signal line; and a power supply controller configured to output either a first pair of differential signals comprising a first voltage difference or a second pair of differential signals comprising a second voltage difference with respect to the one of the electronic devices through the data signal line when a power of the information processor is turned off. According to still another embodiment of the invention, an information processor that charges one of a plurality of electronic devices replaceably connected to the information apparatus via a bus including a data signal line and a power supply line, when signals of a differential signal pair output to the one of the electronic devices through the data signal line have predetermined voltages, respectively, the one of the electronic devices being charged through the power supply line, the information processor has: a controller configured to input and output a data signal with respect to the one of the electronic devices through the data signal line; a first voltage supply configured to supply; a second voltage supply configured to supply; and a power supply controller configured to output either a first pair of differential signals, signals of the first pair of differential signals having predetermined voltages, respectively or a second pair of differential signals, signals of the second pair of differential signals being in a state of short circuit through a resistor with respect to the one of the electronic devices.

Figure 2:
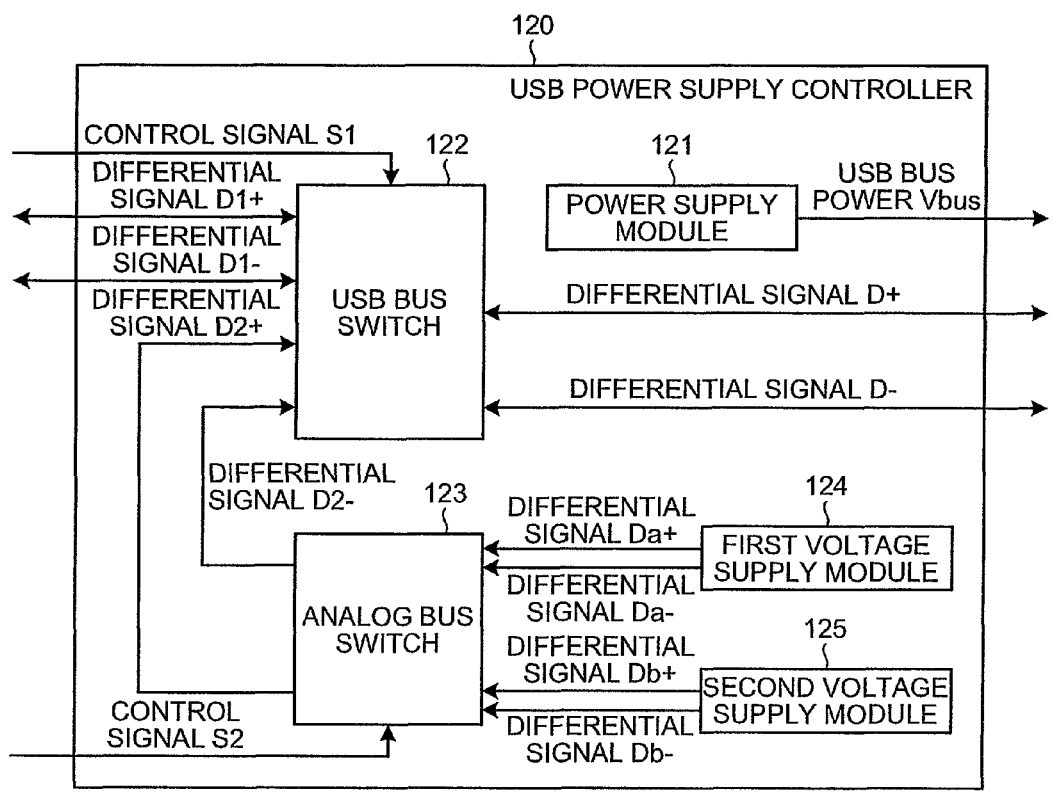
FIG. 2 is an exemplary schematic block diagram of a USB power supply controller in the first embodiment.

In the following, an information processor according to a first embodiment will be described as, for example, a personal computer (PC), with reference to FIGS. 1 and 2. FIG. 1 is a schematic block diagram of a PC with peripheral devices. In the following, a state of the PC when the PC is activated and its power is on is referred to as a normal operation mode. On the other hand, a state of the PC when the power of the PC is off is referred to as a standby mode.

A PC 100 is connected to a display (monitor) 200, a keyboard 300, and a universal serial bus (USB) device 400. In the following, a USB device is, for example, an electronic device such as a portable music player having a built-in battery. Such USB device communicates with the PC through the USB when the USB device is connected to the PC, and also capable of being charged by the PC when a predetermined differential signal pair is input to the USB device as data signals while the USB device is connected to the PC via the USB.

The PC 100 has a central processing unit (CPU) 101, a north bridge 103, a graphics controller 105, a main memory 107, a south bridge 111, a hard disk drive (HDD) 113, a basic input/output system-read only memory (BIOS-ROM) 115, and a USB power supply controller 120. Further, the PC 100 has connectors C1 to C3 for connections to the peripheral devices.

The CPU 101 controls operations of the PC 100, and executes BIOS, OS, or any other application software that is loaded into the main memory 107 from the BIOS-ROM 115 or from the HDD 113.

The north bridge 103 is connected to the CPU 101, the graphics controller 105, the main memory 107, and the south bridge 111. The north bridge 103 has an accelerated graphics port (AGP) controller, a host-peripheral component interconnect (PCI) bridge, a dynamic random access memory (DRAM) controller, and the like. The AGP controller provides an AGP interface for the graphics controller 105. The host-PCI bridge connects between a local bus and a PCI bus. Here, the local bus connects between the CPU 101 and the north bridge 103, and the PCI bus connects between the north bridge 103 and the south bridge 111. The DRAM controller controls communication between the main memory 107 and the CPU 101.

The graphics controller 105 is connected to the monitor 200 such as a liquid crystal display (LCD) through the connector C1 such as a display connector. The graphics controller 105 has a random access memory digital to analog converter (RAMDAC), a video random access memory (VRAM), a video chip, and the like. The graphics controller 105 generates video data based on a drawing command received from the CPU 101, writes the generated video data on the VRAM, and send the finished video to the monitor 200.

The main memory 107 is connected to the north bridge. The BIOS, the OS, a predetermined application such as a USB application software described later, and/or the like, are loaded to the main memory 107.

The south bridge 111 is connected to the BIOS-ROM 115, the HDD 113, the keyboard 300, and the USB power supply controller 120. The south bridge 111 has an integrated drive electronics (IDE) controller, a PCI-industrial standard architecture (ISA) bridge, a multi input/output (I/O) controller, a USB controller, and the like. The IDE controller is connected to, for example, the HDD 113, and controls the HDD 113. The PCI-ISA bridge connects between the PCI bus and the ISA bus. The multi I/O controller controls input and output of the keyboard connected to the PC 100 through the connector C2 such as a personal system (PS)/2 keyboard connector. The USB controller provides a USB interface.

The BIOS-ROM 115 is connected to the south bridge 111. The BIOS is stored in the BIOS-ROM 115, and the BIOS is loaded to the main memory 107 therefrom by the CPU 101, when necessary. The HDD 113 is connected to the south bridge 111. The OS, the USB application software, and the like, are stored in the HDD 113, and the OS, the USB application software, and the like, are each loaded to the main memory 107 from the HDD 113 by the CPU 101, when necessary.

The USB power supply controller 120 is connected to the south bridge 111, and also connected to the USB device 400 via the connector C3, which is a USB connector.

Next, the USB power supply controller is explained in detail with reference to FIG. 2. FIG. 2 is a schematic block diagram of a configuration of the USB power supply controller 120. The USB power supply controller 120 has a power supply module 121, a USB bus switch 122, an analog bus switch 123, a first voltage supply module 124, and a second voltage supply module 125.

The power supply module 121 is connected to the connector C3 through a power supply line, and supplies USB bus power Vbus to the USB device 400 connected to the connector C3. The connector C3 has a configuration (not illustrated) so as to ground the USB device 400 when the USB device 400 is connected to the PC 100. Accordingly, the USB bus power Vbus supplied from the power supply module 121 is supplied to the USB device 400 with reference to the ground (GND).

The power supply module 121 can supply USB bus power Vbus to the USB device 400 when the PC 100 is in the normal operation mode and the standby mode. More particularly, the power supply module 121 has a configuration that switches between a power supply system of the normal operation mode (hereinafter, referred to as normal power supply system) and a power supply system of the standby mode (hereinafter, referred to as standby power supply system). Then, in the normal operation mode, the power supply module 121 supplies USB bus power Vbus to the USB device 400 from a commercial power source (not illustrated) connected to the PC 100 by the normal power supply system. On the other hand, in the standby mode, the power supply module 121 supplies the USB bus power Vbus to the USB device 400 from the commercial power source by the standby power supply system. Consequently, even when the PC 100 is in the standby mode so that the USB bus power cannot be supplied to the USB device 400 by the normal power supply system, the power can be supplied to the USB device 400 from the standby power supply system.

The USB bus switch 122 is connected to the connector C3 through a pair of data signal lines (hereinafter, referred to as differential signal lines) of the USB. The USB bus switch 122 inputs and/or outputs a differential signal pair D+ and D− with respect to the USB device 400 connected to the connector C3. Further, the USB bus switch 122 is connected to the analog bus switch 123, and to the USB controller and to the I/O controller of the south bridge 111. The USB bus switch 122 receives a differential signal pair D2+ and D2− from the analog bus switch 123, inputs and/or outputs a differential signal pair D1+ and D1− with respect to the USB controller, and receives a control signal S1 from the I/O controller.

In particular, the USB bus switch 122 connects the USB device 400 to one of the USB controller and the analog bus switch 123 in response to the control signal S1 described later. As a result, in the normal operation mode, the USB bus switch 122 selects the differential signal pair D1+ and D1− and the differential signal pair D+ and D−. Consequently, data can be communicated between the PC 100 and the USB device 400. In other word, when data is transferred from the USB controller to the USB device 400 while the PC 100 is in the normal operation mode, the USB bus switch 122 outputs the differential signal pair D1+ and D1− corresponding to the data to the USB device 400 as the differential signal pair D+ and D−. Further, when data is transferred from the USB device 400 to the USB controller while the PC 100 is in the normal operation mode, the USB bus switch 122 outputs the differential signal pair D+ and D− corresponding to the data to the USB controller as the differential signal pair D1+ and D1−.

On the other hand, when the PC 100 is in the standby mode, the USB bus switch 122 selects the differential signal pair D2+ and D2−, and outputs the selected pair to the USB device 400 as the differential signal pair D+ and D−.

The USB bus switch 122 receives the control signal S1 from the I/O controller. The control signal S1 controls operations of the USB bus switch 122, and in particular, controls the USB bus switch 122 so as to establish a connection between the USB device 400 and the analog bus switch 123 when the PC 100 is in the standby mode, and to establish a connection between the USB device 400 and the USB controller when the PC 100 is in the normal operation mode.

The USB bus switch 122 may have a configuration including a field effect transistor (FET) that can assure fast data signal communication, because the USB bus switch 122 selectively inputs/outputs a data signal between the USB controller and the USB device 400.

The analog bus switch 123 is connected to the USB bus switch 122 and the I/O controller, and receives a control signal S2 from the I/O controller as well as outputting the differential signal pair D2+ and D2− to the USB bus switch 122. Further, the analog bus switch 123 is connected to the first voltage supply module 124 and the second voltage supply module 125. The analog bus switch 123 receives a differential signal pair Da+ and Da− supplied from the first voltage supply module 124 as well as receiving a differential signal pair Db+ and Db− supplied from the second voltage supply module 125.

More particularly, in response to the control signal S2 described later, the analog bus switch 123 connects the USB bus switch 122 to one of the first voltage supply module 124 and the second voltage supply module 125. As a result, the analog bus switch 123 selects one of the differential signal pair Da+ and Da− supplied from the first voltage supply module 124 and the differential signal pair Db+ and Db− supplied from the second voltage supply module 125, and outputs the selected pair to the USB bus switch 122 as the differential signal pair D2+ and D2−. As described later, the control signal S2 controls the analog bus switch 123 so as to establish a connection between the USB device 400 and a predetermined voltage supply module, which supplies to the data signal line a voltage level necessary for the USB device 400 connected to the PC 100 to be charged.

Unlike the USB bus switch 122, the analog bus switch 123 does not input/output data with respect to the USB device 400. Hence, the analog bus switch 123 does not necessarily have the configuration such as FET for fast communication. Hence, in the first embodiment, the analog bus switch 123 has a configuration including merely an analog switch.

The first voltage supply module 124 is connected to the analog bus switch 123, and outputs the differential signal pair Da+ and Da− to the analog bus switch 123. The second voltage supply module 125 is connected to the analog bus switch 123, and outputs the differential signal pair Db+ and Db− to the analog bus switch 123.

Next, a power supply control of the USB power supply controller 120 with respect to an arbitrary USB device is explained. In the following it is assumed that the PC 100 is connected to one of a predetermined USB device A and a predetermined USB device B. The USB device A is a device that is charged via the power supply line only when a differential signal pair with a predetermined voltage is input thereto through the data signal lines. The USB device B is a device that is charged via the power supply line only when a driving voltage of the signal D+ is recognized on the signal D− through a resistor having 0 to 200 Ohm in the PC 100. Further, it is assumed that the first voltage supply module 124 supplies a differential signal pair Da+ and Da− of a predetermined voltage that make the USB device A chargeable, and assumed that the second voltage supply module 125 supplies a differential signal pair Db+ and Db− that make the USB device B chargeable. Here, the differential signal pair Db+ and Db− is in a state of short circuit through a resistor of 0 to 200 Ohm.

The HDD 113 of the PC 100 stores therein a predetermined USB application software that controls power supply with respect to the USB device 400. When the PC 100 is in the normal operation mode, a user can select one of a first mode and a second mode through the USB application software loaded from the HDD 113 to the main memory 107 and executed by the CPU 101. Here, the first mode makes the USB device A chargeable, and the second mode makes the USB device B chargeable.

When the user requests to charge the USB device A, the user selects the first mode, in which the USB device A is set as a target to be charged, through the USB application software.

When the power of the PC 100 is to be turned off, the BIOS outputs a control signal S2 for controlling the analog bus switch 123 to connect between the USB device A and the first voltage supply module 124, to the analog bus switch 123 through the south bridge 111. As a result, the analog bus switch 123 establishes the connection between the USB bus switch 122 and the first voltage supply module 124. Next, the BIOS outputs a control signal 51 for controlling the USB bus switch 122 to connect between the USB device A and the analog bus switch 123, to the USB bus switch 122. As a result, the USB bus switch 122 establishes the connection between the USB device A and the analog bus switch 123. Consequently, when the PC 100 is in the standby mode, the differential signal pair Da+ and Da− required for charging the USB device A is supplied to the USB device A from the first voltage supply module 124.

Similarly, when the user requests to charge the USB device B, the user selects the second mode, in which the USB device B is set as a target to be charged, through the USB device application software. Consequently, when the PC 100 is in the standby mode, the differential signal pair Db+ and Db− required for charging the USB device B is supplied to the USB device B from the second voltage supply module 125.

As described above, two voltage supply modules are switchably provided in the information processor of the first embodiment. One of the voltage supply modules supplies a voltage level that makes the USB device, which can be charged only when a predetermined voltage level is applied to the data signal lines, chargeable. Other one of the voltage supply modules supplies a voltage level that makes the USB device, which can be charged only when the data signal lines are short-circuited, chargeable. Consequently, the USB device can appropriately be charged.

The information processor of the first embodiment may have a voltage supply module that supplies variable voltage. In particular, for example, the user may change the voltage supplied by the voltage supply module, via the USB application software. Further, the voltage supply module may supply a predetermined voltage signal, a short-circuit signal of D+ and D−, a pulse waveform signal, or the like, to the USB device, as long as they can be authenticated for the charging.

Next, a second embodiment of the invention is explained with reference to FIG. 3. An information processor of the second embodiment differs from the information processor of the first embodiment in the USB power supply controller further having a second analog bus switch and a third voltage supply module. Thus, the same letters and numbers are assigned for parts and elements similar to those of the first embodiment, and the explanations thereof are omitted.

Figure 3:
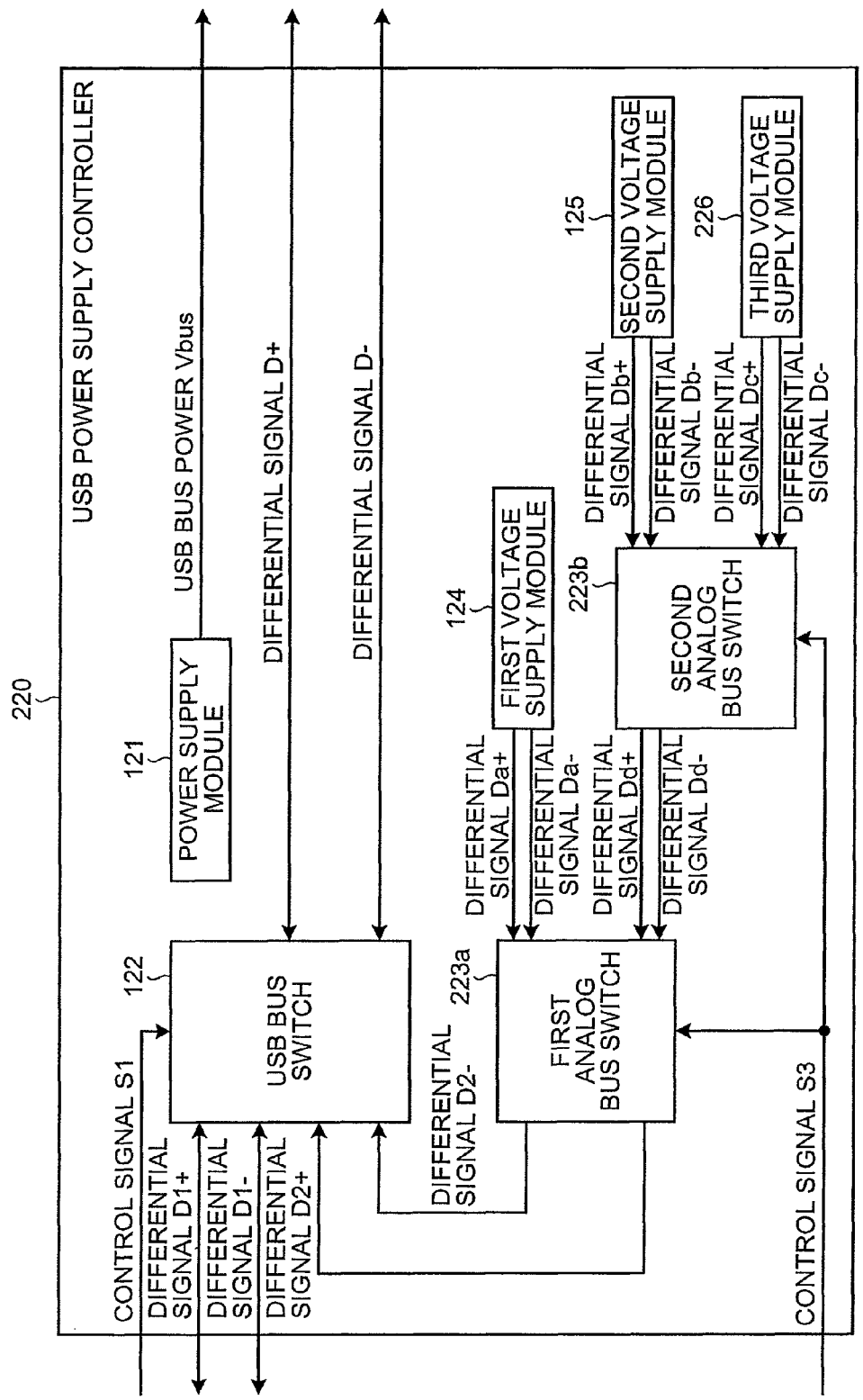
FIG. 3 is an exemplary schematic block diagram of a USB power supply controller in a second embodiment.

FIG. 3 is a schematic block diagram of a configuration of a USB power supply controller of the second embodiment. A USB power supply controller 220 has the power supply module 121, the USB bus switch 122, a first analog bus switch 223a, a second analog bus switch 223b, the first voltage supply module 124, the second voltage supply module 125, and a third voltage supply module 226.

The first voltage supply module 124 is connected to the first analog bus switch 223a, and outputs a differential signal pair Da+ and Da− to the first analog bus switch 223a. The second voltage supply module 125 is connected to the second analog bus switch 223b, and outputs a differential signal pair Db+ and Db− to the second analog bus switch 223b. The third voltage supply module is connected to the second analog bus switch 223b, and outputs a differential signal pair Dc+ and Dc− to the second analog bus switch 223b.

The first analog bus switch 223a is connected to the I/O controller, and receives a control signal S3 from the I/O controller. In response to the control signal S3 for controlling the first analog bus switch 223a to connect between the USB device 400 and the first voltage supply module 124, the first analog bus switch 223a establishes a connection between the USB bus switch 122 and the first voltage supply module 124, and outputs the differential signal pair Da+ and Da− to the USB bus switch 122 as the differential signal pair D2+ and D2−.

On the other hand, in response to the control signal S3 for controlling the first analog bus switch 223a to connect between the USB device 400 and one of the second voltage supply module 125 and the third voltage supply module 226, the first analog bus switch 223a establishes a connection between the USB bus switch 122 and the second analog bus switch 223b, and outputs the differential signal pair Dd+ and Dd− output from the second analog bus switch 223b described later to the USB bus switch 122 as the differential signal pair D2+ and D2−.

The second analog bus switch 223b is connected to the I/O controller, and receives the control signal S3 from the I/O controller. In response to the control signal S3 for controlling the second analog bus switch 223b to connect between the USB device 400 and the second voltage supply module 125, the second analog bus switch 223b establishes a connection between the first analog bus switch 223a and the second voltage supply module 125, and outputs the differential signal pair Db+ and Db− to the first analog bus switch 223a as the differential signal pair Dd+ and Dd−.

On the other hand, in response to the control signal S3 for controlling the second analog bus switch 223b to connect between the USB device 400 and the third voltage supply module 226, the second analog bus switch 223b establishes a connection between the first analog bus switch 223a and the third voltage supply module 226, and outputs the differential signal pair Dc+ and Dc− to the first analog bus switch 223a as the differential signal pair Dd+ and Dd−.

Next, power supply control of the USB power supply controller 220 is explained. In the following it is assumed that the PC 100 is connected to one of a predetermined USB device A, a predetermined USB device B, and a predetermined USB device C. The USB device A is a device that can be charged via the power supply line only when a differential signal pair Da+ and Da− is input thereto through the data signal lines. The USB device B is a device that can be charged via the power supply line only when a differential signal pair Db+ and Db− is input thereto through the data signal lines. The USB device C is a device that can be charged via the power supply line only when a differential signal pair Dc+ and Dc− is input thereto through the data signal lines.

Similar to the first embodiment, when the PC 100 is in the normal operation mode, the user can select one of a first mode that can charge the USB device A, a second mode that can charge the USB device B, and a third mode that can charge the USB device C, through the USB application software.

When the user requests to charge the USB device A, the user selects the first mode, in which the USB device A is set as a target to be charged, through the USB application software.

When the PC 100 is to be turned off, the BIOS outputs a control signal S3 for controlling the first analog bus switch 223a to connect between the USB device A and the first voltage supply module 124, to the first analog bus switch 223a through the south bridge 111. As a result, the first analog bus switch 223a establishes a connection between the USB bus switch 122 and the first voltage supply module 124. Consequently, when the USB device A is connected to the PC 100 while the PC 100 is in the standby mode, the differential signal pair Da+ and Da− required to charge the USB device A can appropriately be supplied to the USB device A through the data signal lines.

On the other hand, when the user requests to charge the USB device B, the user selects the second mode, in which the USB device B is set as a target to be charged, through the USB application software.

When the PC 100 is to be turned off, the BIOS outputs the control signal S3 for controlling the first analog bus switch 223a and the second analog bus switch 223b to connect between the USB device 400 and the second voltage supply module 125 to the first analog bus switch 223a and the second analog bus switch 223b. As a result, the first analog bus switch 223a establishes a connection between the USB bus switch 122 and the second analog bus switch 223b, and the second analog bus switch 223b establishes a connection between the first analog bus switch 223a and the second voltage supply module 125. Consequently, when the USB device B is connected to the PC 100 while the PC 100 is in the standby mode, the differential signal pair Db+ and Db− required to charge the USB device B can appropriately be supplied to the USB device B through the data signal lines. Similarly, when the USB device C is connected to the PC 100 while the PC 100 is in the standby mode, the differential signal pair Dc+ and Dc− required to charge the USB device C can appropriately be supplied to the USB device C.

As described above, according to the information processor of the second embodiment, by providing the second analog bus switch and the third voltage supply module, each of three USB devices which can only be charged when different voltage level is supplied to the data signal lines thereof can appropriately be charged when they are connected to the PC in the standby mode.

Besides, the information processor of the second embodiment may have a plurality of analog bus switches and a plurality of voltage supply modules. As a result, each of a plurality of USB devices can appropriately be charged.

Further, in the information processor of the second embodiment, at least one of the plurality of voltage supply modules may supply a differential signal pair, which makes a predetermined USB device chargeable, to the USB device that receives power through the power line only when a driving voltage of the signal D+ is recognized on the signal D− through the resistor of 0 to 200 Ohm in the PC 100.

Next, a third embodiment of the invention is explained with reference to FIG. 4. An information processor of the third embodiment differs from the information processor of the first embodiment in the USB power supply controller further having a third voltage supply module. Thus, the same letters and numbers are assigned for parts and elements that are similar to that of the first embodiment, and the explanations thereof are omitted.

Figure 4:
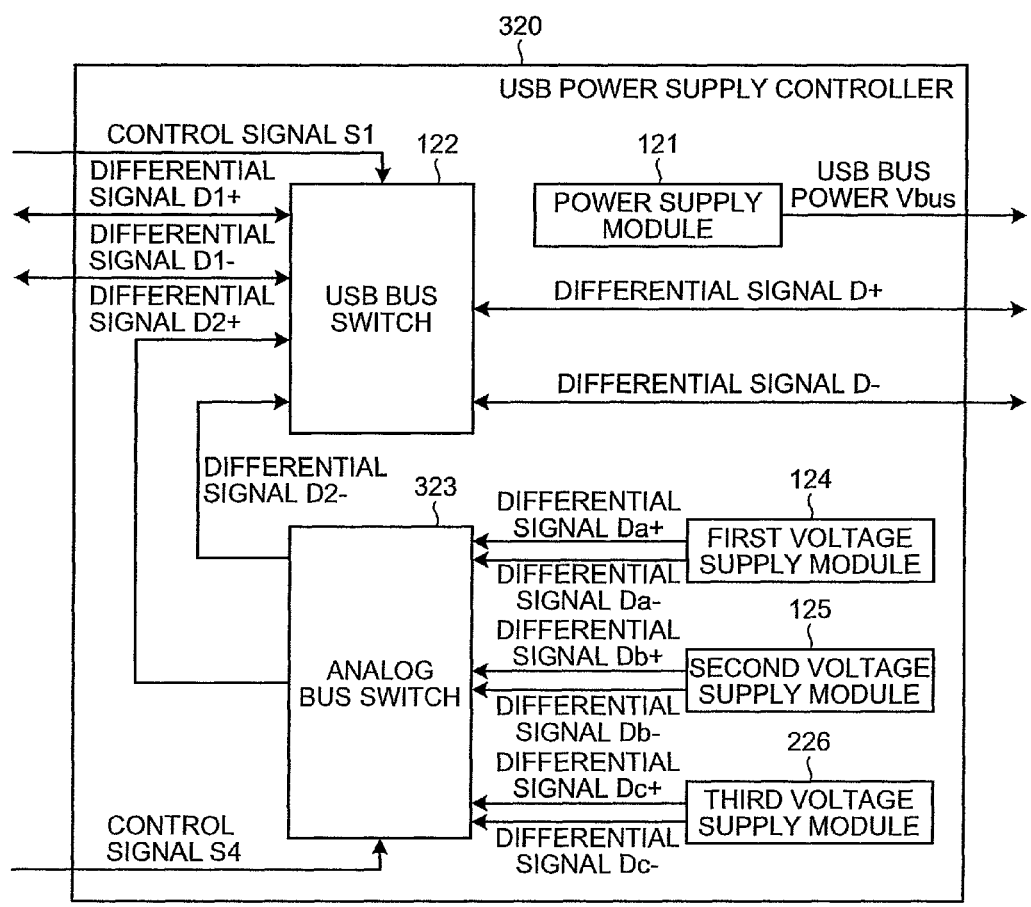
FIG. 4 is an exemplary schematic block diagram of a USB power supply controller in a third embodiment.

FIG. 4 is a schematic block diagram of a configuration of a power supply controller of the third embodiment. A USB power supply controller 320 has the power supply module 121, the USB bus switch 122, an analog bus switch 323, the first voltage supply module 124, the second voltage supply module 125, and the third voltage supply module 226.

The third voltage supply module 226 is connected to the analog bus switch 323, and outputs a differential signal pair Dc+ and Dc− to the analog bus switch 323.

The analog bus switch 323 is connected to the I/O controller, and receives a control signal D4 from the I/O controller. Then, in response to the control signal S4 for controlling the analog bus switch to connect between the USB device 400 and the first voltage supply module 124, the analog bus switch 323 establishes a connection between the USB bus switch 122 and the first voltage supply module 124, and outputs the differential signal pair Da+ and Da− to the USB bus switch 122 as the differential signal pair D2+ and D2−.

On the other hand, in response to the control signal S4 for controlling the analog bus switch 323 to connect between the USB device 400 and the second voltage supply module 125, the analog bus switch 323 establishes a connection between the USB bus switch 122 and the second voltage supply module 125, and outputs the differential signal pair Db+ and Db− to the USB bus switch 122 as the differential signal pair D2+ and D2−.

Further, in response to the control signal S4 for controlling the analog bus switch 323 to connect between the USB device 400 and the third voltage supply module 226, the analog bus switch 323 establishes a connection between the USB bus switch 122 and the third voltage supply module 226, and outputs the differential signal pair Dc+ and Dc− to the USB bus switch 122 as the differential signal pair D2+ and D2−.

Next, the power supply control of the USB power supply controller 320 is explained. In the following it is assumed that the PC 100 is connected to one of a predetermined USB device A, a predetermined USB device B, and a predetermined USB device C. The USB device A is a device that can be charged via the power supply line only when a differential signal pair Da+ and Da− is input thereto through the data signal lines. The USB device B is a device that can be charged via the power supply line only when a differential signal pair Db+ and Db− is input thereto through the data signal lines. The USB device B is a device that can be charged via the power supply line only when a differential signal pair Dc+ and Dc− is input thereto through the data signal lines.

Similar to the first embodiment, when the PC 100 is in the normal operation mode, the user can select one of a first mode that can charge the USB device A, a second mode that can charge the USB device B, and a third mode that can charge the USB device C, through the USB application software.

When the user requests to charge the USB device A, the user selects the first mode, in which the USB device A is set as a target to be charged, through the USB application software.

When the PC 100 is to be turned off, the BIOS outputs the control signal S4 for controlling the analog bus switch 323 to establish a connection between the USB device A and the first voltage supply module 124, to the analog bus switch 323 through the south bridge 111. As a result, the analog bus switch 323 establishes the connection between the USB bus switch 122 and the first voltage supply module 124. Consequently, when the USB device A is connected to the PC 100 while the PC 100 is in the standby mode, the differential signal pair Da+ and Da− required to charge the USB device A can appropriately be supplied to the USB device A through the data signal lines. Similarly, when the USB device B is connected to the PC 100 while the PC 100 is in the standby mode, the differential signal pair Db+ and Db− required to charge the USB device B can appropriately be supplied to the USB device B through the data signal lines. Furthermore, when the USB device C is connected to the PC 100 while the PC 100 is in the standby mode, the differential signal pair Dc+ and Dc− required to charge the USB device C can appropriately be supplied to the USB device C through the data signal lines.

As described above, according to the information processor of the third embodiment, by connecting three voltage supply modules to one analog bus switch, each of three USB devices, which is charged only when a predetermined voltage level is applied to the data signal lines thereof, connected to the PC in the standby mode can appropriately be charged.

In the information processor of the third embodiment, three voltage supply modules are connected to the analog bus switch. However, greater than or equal to four voltage supply module may be connected to the analog bus switch. As a result, each of the USB device can appropriately be charged.

Further, in the information processor of the third embodiment, at least one of the plurality of voltage supply modules may supply a differential signal pair, which makes a predetermined USB device chargeable, to the USB device that receives power through the power line only when a driving voltage on the signal D+ is recognized on the signal D− through the resistor of 0 to 200 Ohm in the PC 100.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processor configured to charge one of a plurality of electronic devices replaceably connected to an information apparatus via a bus comprising a data signal line and a power supply line, when a differential signal pair output to the one of the electronic devices through the data signal line is at or above a predetermined voltage difference, the one of the electronic devices being charged through the power supply line, the information processor comprising:
   an input and output module configured to input and output a data signal through the data signal line;
   a first voltage supply configured to supply a first pair of differential signals comprising a first voltage difference;
   a second voltage supply configured to supply a second pair of differential signals comprising a second voltage difference;
   a first switch configured to select either the first pair of differential signals or the second pair of differential signals, and to use the selected pair as an output in response to a first control signal; and
   a second switch configured to input and/or output the data signal with respect to the one of the electronic devices through the data signal line in a normal operation mode, and to output either the first pair of differential signals or the second pair of differential signals selected by the first switch with respect to the one of the electronic devices through the data signal line in a standby mode, in response to a second control signal.

2. The information processor of claim 1, wherein
   the first voltage difference is configured to cause a first electronic device among the electronic devices to be charged,
   the second voltage difference is configured to cause a second electronic device among the electronic devices to be charged,
   the first control signal is configured to control the first switch to select the first pair of differential signals when the first electronic device is to be connected to the information processor, and to select the second pair of differential signals when the second electronic device is to be connected to the information processor, and
   the first switch is configured to output the first pair of differential signals when the first electronic device is connected to the information apparatus and the second pair of differential signals when the second electronic device is connected to the information apparatus, in response to the first control signal, in response to the first control signal.

3. The information processor of claim 1, further comprising:
   a third voltage supply configured to supply a third pair of differential signals comprising a third voltage difference; and
   a third switch configured to receive the third pair of differential signals supplied from the third voltage supply and the selected pair of the differential signals, and to select either the third pair of differential signals and the selected pair differential signals from the first switch as an output in response to the first control signal, wherein
   the second switch is configured to receive the output from the third switch as an input, and to output either the third pair of differential signals or the selected pair of the differential signals by the first switch to the electronic device through the data signal line in response to the second control signal.

4. An information processor configured to charge one of a plurality of electronic devices replaceably connected to an information apparatus via a bus comprising a data signal line and a power supply line, when a differential signal pair output to the one of the electronic devices through the data signal line is at or above a predetermined voltage difference, the one of the electronic devices being charged through the power supply line, the information processor comprising:
   an input and output module configured to input and output a data signal through the data signal line;
   a first voltage supply configured to supply a first pair of differential signals comprising a first voltage difference;
   a second voltage supply configured to supply a second pair of differential signals comprising a second voltage difference; and
   a power supply controller configured to output either the first pair of differential signals or the second pair of differential signals with respect to the one of the electronic devices through the data signal line when a power of the information processor is turned off in response to a control signal.

5. The information processor of claim 4, wherein
   the power supply controller is configured to input and/or output the data signal with respect to the one of the electronic devices through the data signal line when the power of the information processor is turned on.

6. The information processor of claim 4, wherein
   the control signal includes a first control signal and a second control signal, and
   the power supply controller is configured to output either the first pair of differential signals or the second pair of differential signals with respect to the one of the electronic devices through the data signal line when the power of the information processor is turned off in response to a combination of a content of the first control signal which is input and a content of the second control signal which is input.

7. The information processor of claim 4, wherein
   the first voltage difference is configured to cause a first electronic device among the electronic devices to be charged,
   the second voltage difference is configured to cause a second electronic device among the electronic devices to be charged,
   the first control signal is configured to control the first switch to select the first pair of differential signals when the first electronic device is to be connected to the information processor, and to select the second pair of differential signals when the second electronic device is to be connected to the information processor, and the power supply controller is configured to output the first pair of differential signals when the first electronic device is connected to the information apparatus and the second pair of differential signals when the second electronic device is connected to the information apparatus, in response to the control signal.

8. An information processor configured to charge one of a plurality of electronic devices replaceably connected to an information apparatus via a bus comprising a data signal line and a power supply line, when signals of a differential signal pair output to the one of the electronic devices through the data signal line have predetermined voltages, respectively, the one of the electronic devices being charged through the power supply line, the information processor comprising:
an input and output module configured to input and output a data signal through the data signal line;
a first voltage supply configured to supply a first pair of differential signals, signals of the first pair of differential signals having predetermined voltages, respectively;
a second voltage supply configured to supply a second pair of differential signals, signals of the second pair of differential signals being in a state of short circuit through a resistor; and
a power supply controller configured to select either the first pair of differential signals supplied from the first voltage supply or the second pair of differential signals supplied from the second voltage supply as an output in response to a control signal, and to output either the first pair of differential signals or the second pair of differential signals with respect to the one of the electronic devices through the data signal line when a power of the information processor is turned off.

9. The information processor of claim 8, wherein
the power supply controller is configured to input and/or output the data signal with respect to the one of the electronic devices through the data signal line when the power of the information processor is turned on.

10. The information processor of claim 8, wherein
the control signal includes a first control signal and a second control signal, and
the power supply controller is configured to output either the first pair of differential signals or the second pair of differential signals with respect to the one of the electronic devices through the data signal line when the power of the information processor is turned off in response to a combination of a content of the first control signal which is input and a content of the second control signal which is input.

11. The information processor of claim 8, wherein
the power supply controller is configured to output the first pair of differential signals when the first electronic device is connected to the information apparatus and the second pair of differential signals when the second electronic device is connected to the information apparatus, in response to the control signal.

12. An information processor configured to charge one of a plurality of electronic devices replaceably connected to an information apparatus via a bus comprising a data signal line and a power supply line, when a differential signal pair output to the one of the electronic devices through the data signal line is at or above a predetermined voltage difference, the one of the electronic devices being charged through the power supply line, the information processor comprising:
a controller configured to input and output a data signal with respect to the one of the electronic devices through the data signal line; and
a power supply controller configured to output either a first pair of differential signals comprising a first voltage difference or a second pair of differential signals comprising a second voltage difference with respect to the one of the electronic devices through the data signal line when a power of the information processor is turned off.

13. The information processor of claim 12, wherein
the power supply controller is configured to switch either the first pair of differential signals or the second pair of differential signals with respect to the one of the electronic devices as an output in response to an input control signal.

14. The information processor of claim 12, wherein
the power supply controller is configured to cause the controller to input and/or output the data signal with respect to the one of the electronic devices through the data signal line when a power of the information processor is turned on.

15. The information processor of claim 13, wherein
the control signal includes a first control signal and a second control signal, and
the power supply controller is configured to output either the first pair of differential signals or the second pair of differential signals with respect to the one of the electronic devices through the data signal line when the power of the information processor is turned off in response to a combination of a content of the first control signal which is input and a content of the second control signal which is input.

16. An information processor configured to charge one of a plurality of electronic devices replaceably connected to an information apparatus via a bus comprising a data signal line and a power supply line, when signals of a differential signal pair output to the one of the electronic devices through the data signal line have predetermined voltages, respectively, the one of the electronic devices being charged through the power supply line, the information processor comprising:
a controller configured to input and output a data signal with respect to the one of the electronic devices through the data signal line; and
a power supply controller configured to output either a first pair of differential signals, signals of the first pair of differential signals having predetermined voltages, respectively or a second pair of differential signals, signals of the second pair of differential signals being in a state of short circuit through a resistor with respect to the one of the electronic devices.

17. The information processor of claim 16, wherein
the power supply controller is configured to switch either the first pair of differential signals or the second pair of differential signals with respect to the one of the electronic devices as an output in response to an input control signal.

18. The information processor of claim 16, wherein
the power supply controller is configured to cause the controller to input and/or output the data signal with respect to the one of the electronic devices through the data signal line when a power of the information processor is turned on.

19. The information processor of claim 16, wherein
the control signal includes a first control signal and a second control signal, and
the power supply controller is configured to output either the first pair of differential signals or the second pair of differential signals with respect to the one of the electronic devices through the data signal line when the power of the information processor is turned off in response to a combination of a content of the first control signal which is input and a content of the second control signal which is input.

* * * * *